United States Patent [19]

Mullins et al.

[11] Patent Number: 5,614,788
[45] Date of Patent: Mar. 25, 1997

[54] AUTOMATED AMBIENT CONDITION RESPONSIVE DAYTIME RUNNING LIGHT SYSTEM

[75] Inventors: Patrick Mullins, Ormond Beach; Charles Benedict; Jay S. Tiedeberg, both of Tallahassee, all of Fla.

[73] Assignee: Autosmart Light Switches, Inc., Tallahassee, Fla.

[21] Appl. No.: 510,092

[22] Filed: Aug. 1, 1995

Related U.S. Application Data

[63] Continuation-in-part of Ser. No. 381,647, Jan. 31, 1995, abandoned.

[51] Int. Cl.$^6$ ................................ B60Q 1/02; B60Q 1/04
[52] U.S. Cl. ........................... 315/82; 315/77; 307/10.8
[58] Field of Search ............................ 307/10.8, 10.1; 315/82, 77, 83; 340/458, 459

[56] References Cited

U.S. PATENT DOCUMENTS

| | | | |
|---|---|---|---|
| 3,391,301 | 7/1968 | Poznik | 315/83 |
| 3,832,597 | 8/1974 | Mitchell | 315/82 |
| 3,932,788 | 1/1976 | Groover | 315/82 |
| 4,667,129 | 5/1987 | Papillon | 315/82 |
| 4,684,819 | 8/1987 | Haag et al. | 307/10.8 |
| 4,686,423 | 8/1987 | Eydt | 315/82 |
| 4,723,095 | 2/1988 | Svazas et al. | 315/82 |
| 4,728,861 | 3/1988 | Kurihara et al. | 315/83 |
| 4,831,310 | 5/1989 | Heintzberger et al. | 315/77 |
| 4,841,199 | 6/1989 | Irie | 315/83 |
| 4,899,083 | 2/1990 | Kataoka et al. | 315/77 |
| 4,928,036 | 5/1990 | Abboud | 315/82 |
| 4,983,883 | 1/1991 | Roland | 315/77 |
| 5,030,884 | 7/1991 | Roussey et al. | 315/83 |
| 5,075,593 | 12/1991 | Shoda | 315/82 |

*Primary Examiner*—Robert Pascal
*Assistant Examiner*—Arnold Kinkead
*Attorney, Agent, or Firm*—Dowell & Dowell

[57] ABSTRACT

An automated daytime running light system for surface transport vehicles having headlights and taillights which includes a daytime running light control circuit which activates the highbeam filament of the headlights at a reduced power level whenever the vehicle ignition is ON and the starter motor OFF during daylight conditions. In one embodiment, the daytime running light control circuit activates the high beam filaments of the headlight at a reduced power level and also activates the parking lights to provide taillights whenever the vehicle ignition is ON and the starter motor OFF during daylight conditions. The system further includes a navigational lighting control circuit which is responsive to ambient condition sensor inputs such as low light level sensors, fog or moisture sensors, windshield wiper actuation sensors and the like, to de-activate the daytime running light control circuit and activate the vehicles headlights and taillights and other running lights at normal power levels as long as such sensors are activated or whenever the vehicle headlights are manually activated. The system may further include an emergency brake indicator circuit which turns off the daytime running light and navigational lighting control circuits, and the vehicle headlights and/or taillights controlled thereby, whenever the emergency brake is engaged and may further include an external shut-off circuit for turning off the daytime running light and navigational lighting control circuits, or portions thereof, when activated.

38 Claims, 4 Drawing Sheets

AUTOMATED AMBIENT CONDITION RESPONSIVE DAYTIME RUNNING LIGHT SYSTEM

CROSS-REFERENCE TO RELATED APPLICATIONS

This application is a continuation-in-part of U.S. application Ser. No. 08/381,647 filed Jan. 31, 1995, now abandoned, entitled Automated Ambient Condition Responsive Daytime Running Light System in the name of the same inventors.

BACKGROUND OF THE INVENTION

1. Field of the Invention

This invention is generally directed to daytime running light systems for surface transportation vehicles which include control circuitry for activating the vehicle headlights under normal daylight conditions upon sensing of the vehicle ignition and starter. More particularly, the present invention is directed to an automated ambient condition response daytime running light system which includes a daytime running light control circuit for activating the highbeam filaments at low energy levels whenever the starter motor is OFF and the ignition is ON which daytime running light control circuit is automatically overridden and de-activated by a navigational lighting control circuit which is responsive to ambient condition sensors and which is operable to activate the vehicle headlights, taillights and other exterior running like at normal power levels when conditions such as low light levels, fog or moisture have been sensed or whenever the vehicle windshield wiper motor has been activated. In one embodiment, the daytime running light control circuit also simultaneously activates the parking lights so as to illuminate the vehicle tail lights. The system further provides an automatic override of the daytime running light and navigational lighting control circuits by manual activation of the vehicle headlight switch, by external override or by parking brake engagement.

2. History of the Related Art

Studies have shown that accident rates can be reduced among surface transportation vehicles such as automobiles, trucks, buses and the like merely be making such vehicles more conspicuous. There are numerous proposals for utilizing existing navigational light devices of vehicles including headlights, taillights, ICC trailer lights and the like for improving the manner in which the vehicle is made conspicuous in the daytime. Some proposals energize the highbeam filaments of the vehicle headlamp assemblies at reduce power and others energize the lowbeam filaments of the headlamp assemblies at normal power. In addition to the foregoing, some versions of both highbeam and lowbeam designs also energize existing taillight and/or parking light assemblies. Currently, some state and national government agencies are considering, or have adopted, legislation describing or requiring the use of such devices to provide an added safety factor to vehicle operation. It appears that the general trend is to require daytime running light systems on all automotive vehicles including newly manufactured trucks, buses, and cars. Such regulations, however, may also be extended to require the retrofitting of vehicles which are currently in service.

In the U.S. Pat. No. 4,684,819 to Haag et al., a headlight control system is disclosed wherein headlights are energized at reduced intensity in response to predetermined vehicle operating conditions. In U.S. Pat. No. 4,899,832 to Kataoka, a headlamp control circuit is disclosed which provides a by-pass for the manual lighting switch. In this patent, the headlamps are automatically turned on when the engine operation becomes stable after a completion of engine start-up. U.S. Pat. No. 4,686,423 to Eydt discloses an automatic headlight control circuit for operating the headlights of an automotive vehicle when the engine is operating and wherein the headlights are energized at a reduced power level. Additional examples of prior art daytime running light systems are disclosed in U.S. Pat. Nos. 4,831,310 to Heintzberger et al. and 4,667,129 to Papil et al.

In addition to improvements in developing daytime running light systems, there have also been numerous proposals for automatically controlling vehicle lighting systems to activate at normal power intensity levels during appropriate ambient conditions such as at low light levels, darkness, and where weather interferes with normal sight distance, such as in periods of rain or fog. Such systems incorporate detection devices which activate the vehicle lighting system in response to darkness or to the detection of moisture. Some of these systems further provide for sensing the activation of windshield/wiper controls or motors so as to automatically activate the vehicle lighting system when the wiper system is activated.

As with daytime running lights, many state governmental agencies have adopted legislation which requires that whenever the vehicle windshield wipers are engaged, that the vehicle lowbeams and taillights must also be illuminated. As with the daylight running light system, it is the desire of governmental agencies, as well as insurance companies, to make vehicles more conspicuous during periods of poor ambient visibility conditions.

Some examples of controlling the navigational lighting systems of surface vehicles during periods of poor ambient light and visibility conditions are disclosed in U.S. Pat. Nos. 4,956,562, 5,136,209, and 5,185,558 all assigned to the Assignee of the present application.

Both the daytime running light systems and the ambient condition navigational lighting control systems of the prior art provide for increased safety in surface transport vehicle operation. However, there are certain problems inherent in some systems which can lead to unsafe conditions. For instance, in some current systems which are being utilized in surface transportation vehicles, power is supplied whenever the motor of the vehicle is engaged to activate the headlight system. In order to conserve on energy and to prolong the life of the headlights, many such systems reduce the power which is supplied to the highbeam filament of the headlight system. With such systems, normally no power is supplied to the vehicle taillights. In the event the ambient conditions change during operation of the vehicle, such as at dusk or during periods of rain when visibility makes the vehicle less conspicuous, the vehicle operator may realize that the headlights are illuminated although at reduced power. If the vehicle operator does not take action to manually disengage the daytime running lighting system by manually engaging the lowbeams or the highbeams of the vehicle system by operation of the vehicle headlight switch, the taillights of the vehicle will not be illuminated, thus creating a situation where the vehicle is not conspicuous from the rear during such periods of poor ambient conditions. Therefore, in one sense, the daytime running system provides a false sense of safety and security to the vehicle operator.

SUMMARY OF THE INVENTION

The present invention is directed to an automatic ambient condition controlled daytime running light system for transport vehicles which includes a first daytime running light (DRL) control circuit for activating the High Beam filament of the vehicle headlamps during daylight hours in response to the vehicle ignition being in an ON condition and the vehicle starter being in an OFF condition. The system further includes a navigational light (NL) control system for automatically extinguishing the DRL control circuit in response to sensors for detecting poor ambient conditions including fog or moisture sensors and low light level sensors and windshield wiper sensors. The NL control circuit is responsive to the ignition being in an ON condition, the starter being in an OFF condition and to the receipt of an input from any of the ambient condition sensors to thereby automatically terminate power supply to the High Beam filament by deactivating the DRL control circuit and to activate the vehicle low beam headlights, taillights and any associated ICC running lights.

In a preferred embodiment, both the DRL control circuit and the NL control circuit are responsive to input from a parking brake sensor so that, when the parking brakes are engaged, both the DRL control circuit and the NL control circuit are placed in an OFF condition. A manual override switch is also provided in the system so as to extinguish the DRL and some or all of the NL control circuits so that a vehicle engine may remain running with the headlights and parking lights in an OFF condition as may be required for military and various types of service vehicle applications.

In the preferred embodiments, the DRL control circuit and the NL control circuit both include MOSFET switches which receive gate and source inputs from associated high side FET drivers. The DRL FET driver receives a modulated signal from a High Beam Modulator so that power to the High beam filament from the DRL MOSFET is provided at a reduced level to prolong the life of the filament. The FET driver of the NL control circuit receives power input from a delay-OFF timer which allows the vehicle navigational lights to remain in an ON condition for a predetermined amount of time following the control circuit being in an OFF condition.

In an alternative embodiment of the present invention, the NL control circuit includes a pair of MOSFET switches with one being connected to the output of the vehicle headlight switch and the other being connected to the output of the vehicle parking and ICC running light switch. The MOSFETS are separately driven by separate FET drivers which are each connected to receive input signals from the delay-OFF timer. In this embodiment, an external shut-off switch may be provided between one or both of the NL FET drivers and the delay-OFF timer.

In the alternate embodiment, the circuit is designed such that the parking lights will be illuminated whenever the ignition switch is ON and the starter motor is OFF to thereby provide continuous illumination of the vehicle taillights during the operation of the daylight running light system.

It is the primary object of the present invention to provide a safety system for transport vehicles including cars, trucks, buses and the like wherein, during normal daylight hours, whenever the ignition is in an ON condition and the starter motor is in an OFF condition, the High Beam filaments of the vehicle headlights are supplied with power at a reduced level so as to illuminate the High Beam filaments to thereby make the vehicle more conspicuous and wherein the power to the High Beam filaments is extinguished in response to sensors detecting poor ambient conditions such as fog, moisture or low light levels so that the navigational lights of the vehicle are automatically activated at normal power levels during periods of such poor ambient conditions.

It is yet another object of the present invention to provide a safety system for transport vehicles which not only provides for the illumination of the vehicle High Beam filaments during normal daylight hours but also allows the navigational running lights including the headlights, parking lights and ICC running lights to be automatically activated in a normal manner in response to poor ambient conditions which are sensed by sensors having inputs into the system and wherein, when a poor ambient condition is no longer sensed, low level power is automatically restored to the High Beam filament.

It is also an object of the present invention to provide a safety system as previously discussed in the foregoing paragraph wherein power from the vehicle battery is not provided to either the DRL or NL control circuits during periods when the starter motor is activated or during periods when the parking brake has been applied. Further, it is an object of the invention to allow an override of the overall system so that only conventional lighting utilizing the vehicle's manual headlight and taillight switches is possible.

It is another object of the present invention to provide a safety system as previously discussed in the foregoing paragraphs wherein when the vehicle high beam headlight filaments are operated at reduced power by operation of the daylight running light system, the vehicle parking lights will also be illuminated to ensure that the vehicle taillights are illuminated whenever the vehicle ignition switch is ON and the starter motor is OFF

DETAILED DESCRIPTION OF THE PREFERRED EMBODIMENT

Figure 1:
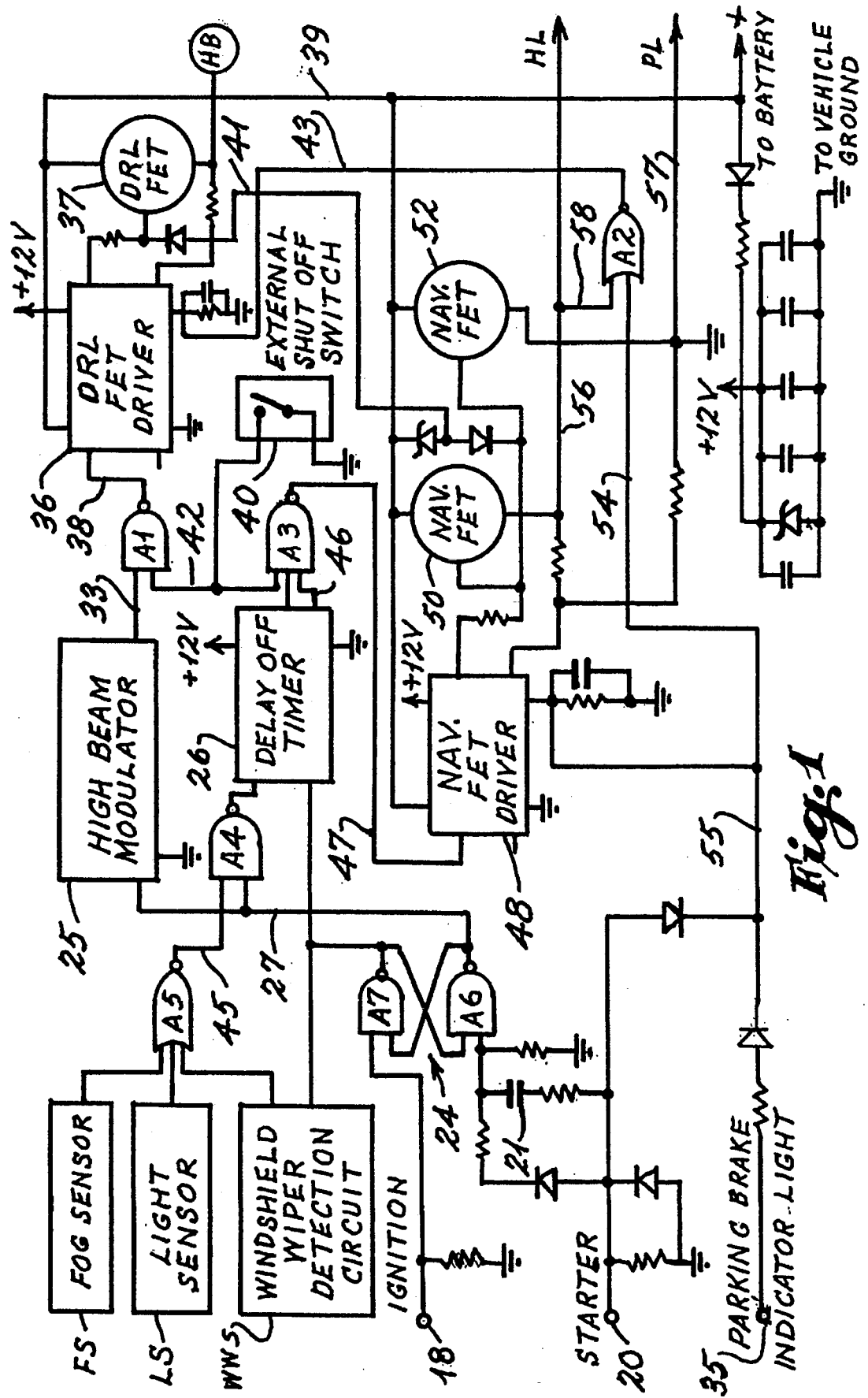
FIG. 1 is an electrical block diagram of the automated ambient condition responsive daytime running light system of the present invention.

The following description makes use of block diagrams, as shown in FIG. 1, and circuit diagrams as shown in FIGS. 2 through 6 to describe the automated ambient condition responsive daytime running light system of the present invention. The system is designed to be used with surface transportation vehicles having headlights, tail or parking lights, and other exterior lights such as ICC running lights, including automobiles, trucks, buses, and the like. The system includes a Daytime Running Light (DRL) control circuit for activating the highbeam filament HB of the headlights at a reduced power level whenever the vehicle Starter motor is deactivated following a Start cycle and with the Ignition in an "ON" condition. The DRL control circuit is automatically overridden in response to ambient light and weather condition sensors which activate a Navigational Lighting (NL) control circuit which is responsive to the sensors. For purposes of this application, navigational lights refer to the headlights, tail or parking brake lights and any other exterior lights associated with the vehicle such as ICC lights incorporated on trucks, trailers and buses.

With specific reference to the block diagram of FIG. 1, the Ignition 18 is the primary control input of the automated daytime running light system. With the Ignition input 18 in the Low or "OFF" state, a Starter Sequence Latch 24 is reset thereby providing a False signal to connected AND gate A4 and a High Beam Modulator 25. This False signal forces the AND gate's output to a False state, and turns OFF a High Beam Modulator 25 which supplies modulated power through the DRL control circuit to apply reduced power to the highbeam filaments HB of the vehicle headlights. With AND gate's A4 output in a FALSE state when the Ignition input is in the Low or OFF state, power to a delay-OFF Timer 26 is also turned OFF. This action immediately removes any further enabling of the delay-OFF timer 26 which, if any of the vehicle navigational lights were previously ON, would function to maintain illumination of the navigational lights for a predetermined period after shutting OFF the Ignition. The length of time lights are retained ON after the Ignition is turned OFF may be varied by the manufacturer for any period thereby allowing an individual to turn OFF the Ignition while having the benefit of the operation of the navigational lights.

When Starter 20 is activated with the Ignition in the ON condition, a capacitor 21 leading to the input to a NAND gate A6 will discharge in preparation for the Starter input to return to the OFF state at which time the charging capacitor 21 will send a Low or False signal to NAND gate A6 causing it to toggle the state of the Starter Sequence Latch 24. With the Latch in its Enabled state, a High or True signal is sent to AND gate A4 and to the High Beam Modulator 25 through input 27. In this manner, a modulated signal is supplied to AND gate A1 while a signal is supplied to AND gate A4 enabling it to respond to signals received from the various ambient condition sensors associated with the NL control circuit of the present invention.

The navigational lights of the vehicle are controlled in response to activation of one or more ambient condition sensors. In FIG. 1, there is shown a light sensor amplifier circuit LS, fog or moisture sensor amplifier circuit FS, and a windshield wiper motor detector or sensor WWS. Each of the sensors or detectors, are connected through an OR gate A5 to the AND gate A4. During daylight hours when light levels are normal, under no fog or moisture conditions, and when the windshield wipers are not activated, all inputs to the OR gate A5 are Low or False, therefore, the output of the AND gate A4 remains False so that no signal is supplied to the delay-OFF Timer 26 or to the navigational lights of the vehicle.

The Starter Sequence Latch 24 includes two CMOS-4093 type Schmitt Trigger NAND gates A6 and A7 commonly available from Motorola, RCA, or National. The NAND gates are connected in a cross-coupled configuration and powered from a nominal eight to twelve volt source such as the vehicle battery. With this power supply voltage, the NAND gates respond to a logic LOW as less than five volts and a logic HIGH greater than eight volts.

When the Starter Sequence Latch has toggled and the Starter input 20 remains Low or False, that is, the starter motor is not engaged but the Ignition 18 is ON, input 33 from the High Beam Modulator to the AND gate A1 will be True. In this condition, the High Beam Modulator 25 is also in the True portion of its cycle and a reduced power signal is supplied through AND gate A1 to a DRL integrated FET driver 36. The integrated FET driver 36 is connected through the DRL MOSFET switch 37 to the highbeam filaments HB of the vehicle headlights so that as a signal is supplied to the integrated FET driver 36, at the frequency and duty cycle developed by the High Beam Modulator 25, power is supplied at a reduced voltage level to the highbeam filaments. Normally, the highbeam filaments will be operating at approximately fifty percent (50%) of their normal operating voltage. Operating the highbeams at the reduced voltage prolongs the life of the highbeam filaments and also provides sufficient light intensity to make the headlights conspicuous, but without causing undue glare. Further, utilizing the highbeam filaments, it is possible to obtain a broader dissemination of the light than is possible with the lowbeams of the vehicle headlights.

In one embodiment of the invention, activation of the High Beam Modulator 25 requires that a parking brake indicator light input 35 be in an OFF condition, that is, the parking brake of the vehicle must be disengaged or released. If the parking brake indicator light input 35 is activated when the parking brake is applied, a TRUE or ON signal will be sent to an OR gate A2 thereby disabling the integrated DRL FET driver 36 which is connected at it's pin 8 to the output of the OR gate A2 through line 43 and thus terminating the power supply to the highbeam filaments through the MOSFET 37 of the DRL control circuit. In a like manner, when the starter is ON, a TRUE or ON signal is sent to OR gate A2 which is connected through line 43 to pin 8 of the DRL FET driver 36, again disabling the DRL FET driver 36.

The High Beam Modulator 25 provides a switching frequency of approximately 100 Hertz with a duty cycle of approximately thirty percent (30%). The modulator 25 develops a resultant frequency which presents repetitive ON and OFF signals to the DRL integrated FET driver 36 which in turn powers the headlight filament HB resulting in an averaged reduced power.

Figure 2:
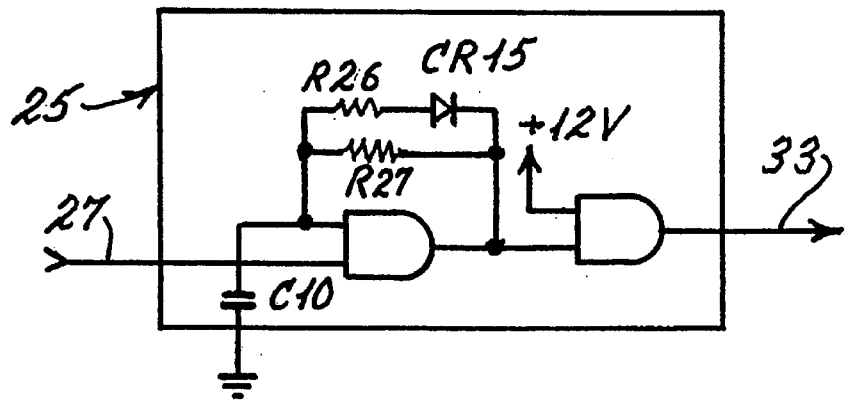
FIG. 2 is a circuit diagram of the High Beam Modulator of FIG. 1.

With particular reference to FIG. 2, the High Beam Modulator 25 is preferably a multi-vibrator comprised of a CMOS-4093 Schmitt Trigger NAND gate available from Motorola, RCA, or National. The oscillator includes a feedback diode CR15 and a feedback resistor R26 which effectively adjust the duty cycle to provide for the appropriate power reduction. The oscillator base frequency is established with resistor R27 and capacitor CIO.

Figure 3:
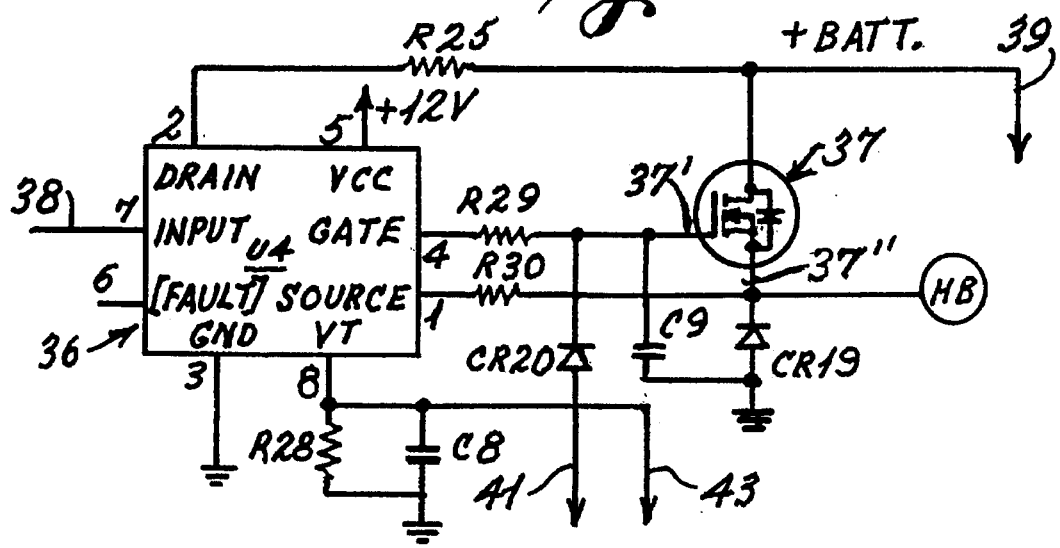
FIG. 3 is a circuit of the DRL high beam filament driver circuit of FIG. 1.

With particular reference to FIG. 3, the highbeam filament driver circuit associated with the DRL control circuit of the present invention is shown in greater detail. The driver circuit includes an electronic MOSFET, Field Effect Transistor, output switching device 37 which controls the application of power to the highbeam filament HB. The MOSFET is utilized for maximum reliability and minimal heat dissipation within the electronic system. In order to completely turn ON an "N" channel MOSFET for minimum voltage drop across it, a voltage greater than 4 volts is required between its gate, 37', and source, 37", terminals which must be produced in addition to the nominal supply voltage. In order to accomplish this, a Motorola MC33091 Integrated Driver Circuit, also known as a high side driver or digital logic timer, 36, is utilized to generate the gate voltage for the MOSFET. Protected resistances R29 and R30 are provided between the integrated DRL FET driver 36 gate (pin 4) and source (pin 1) connections, respectively, to and with the respective gate and source connections of the MOSFET switch 37. These resistances protect the integrated DRL FET driver when transients occur on the external connections associated therewith. The source pin 1 of the integrated FET driver is also connected through resistor R30 to the highbeam filament HB. Control input to pin 7 of the integrated FET driver is from the output 38 from the AND gate A1 which receives the modulated signal from the High Beam Modulator 25.

The digital logic timer circuits of the integrated DRL FET driver 36 are powered from a regulated and filtered power supply including C3, C4, C6, C7, C12, and VR2, and the positive twelve volt side of the vehicle battery as shown in FIG. 1, which supplies the voltage input at VCC or pin 5 of the DRL FET driver. The drain pin 2 of the DRL FET driver is also connected, together with the MOSFET drain, to the positive side of the vehicle battery through connection 39. The MOSFET gate 37' is further protected from transients through line 41, coupling diode CR20 and clamping Zener diode VR3 associated with the NL control circuit of FIG. 5. The MOSFET gate is also connected through capacitor C9 to ground.

A further safety is incorporated into the system to avoid MOSFET failure in the event of lost ground connection. As shown in FIG. 3, the cathode of diode CR19 is connected to the MOSFET source output 37' whereas the anode of CR19 is connected to ground. This diode provides an electrical reference to ground in the event the system ground connection is lost, not to maintain the operation of the system, but to prevent circuit failure. Without this diode component connection, a lost ground connection could ordinarily destroy MOSFET 37 because the integrated DRL FET driver 36 cannot develop full voltage potential to properly saturate the input gate to the MOSFET.

The present invention also includes an external shut-off switch 40 which is connected at 42 to the AND gate A1. When switch 40 is closed, a ground connection is created which provides an OFF or FALSE signal to the input pin 7 of the integrated DRL FET driver 36.

Pin 8 of the integrated DRL FET driver 36 is also connected to the output 43 of OR gate A2. The OR gate A2 receives signals from the Starter input 20 and the parking brake light indicator input 35. Therefore, whenever either of inputs 20 or 35 are High or ON, a shut-off signal is supplied by OR gate A2 thereby removing gate voltage from the DRL FET driver 36 and terminating power to the MOSFET 37. In this manner DRL operation of the High Beam filament will be terminated during activation of the starter or when the parking brake is engaged. Pin 8 of FET driver 36 is also connected to an integration filter circuit to ground through resistor R28 and capacitor C8.

The benefit of the present invention over prior art daytime running light systems is that the DRL control circuit is also automatically overridden to shut-off power to the highbeam filament in response to the activation of the navigational light (NL) control circuit which is itself responsive to sensed ambient conditions. When sensors associated with the system such as the light sensor LS, fog sensor FS, and the windshield wiper sensor WWS detect the presence of a condition which requires that power be supplied to the navigational lighting of the vehicle, the NL control circuit will automatically override the DRL control circuit. Further, upon removal of any condition requiring navigational lighting, the DRL circuit is again automatically activated to provide reduced power to the highbeam filament HB.

Figure 4:
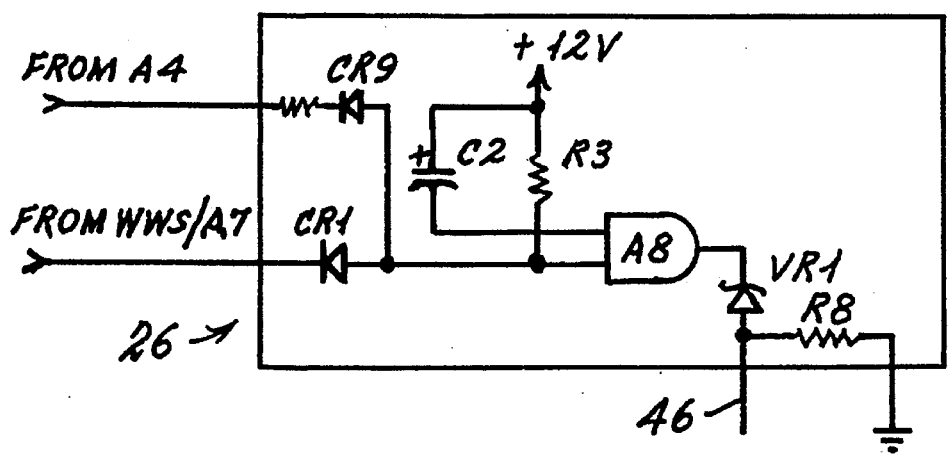
FIG. 4 is a circuit diagram of the delay-OFF timer of FIG. 1.

The NL control circuit of the present invention includes the delay-OFF timer 26 which maintains the navigational lighting ON for a timed period after removal of a sensed condition. With particular reference to FIG. 4, the delay-OFF timer 26 receives input signals from AND gate A4 through resistor R21 and diode CR9 and from the windshield wiper sensor WWS and Ignition 18 through the NAND gate A7 of the starter sequence latch 24 through diode CR1. If input is received through CR1 or CR9, a timing capacitor C2 will be charged and the output 46 of NAND gate A8 will be True or High. The resistor R3 and capacitor C2 govern the discharge rate. Zener diode VR1 reduces the True state voltage to a level compatible with an FET driver 48 of the NL control circuit so as to disable the driver circuit whenever the vehicle battery voltage is too low for proper FET driver operation. The timer is connected to ground through resistor R8. As previously mentioned, whenever a sensed condition is removed to deactivate the NL control circuit, the input signal to the delay-OFF timer will become FALSE and the timer will, at a predetermined period, disable the FET driver 48 and thereby turn OFF the navigational running lights.

The NL control system also includes inputs to deactivate some or all of the navigational lights of the vehicle when the starter is engaged or when the parking brake of the vehicle has been applied. This feature is particularly useful for military and utility or service vehicles to extinguish power to the navigational lights when the motor is running.

With particular reference to FIG. 1, when an ambient low light level, moist weather condition or activation of the windshield wipers is sensed by one of the sensors, a digital signal will be sent establishing a True condition at one of the inputs of OR gate A5. The output 45 signal from OR gate A5 is passed to AND gate A4 which powers the delay-OFF timer 26. The delay-OFF timer is connected at 46 to the input of AND gate A3 which is utilized to control power to a second integrated FET driver 48 which is associated with the NL control circuit. AND gate A3 is also connected at 42 to the external shut-OFF switch 40 so that when the switch is closed, the AND gate input will be connected to ground.

Figure 5:
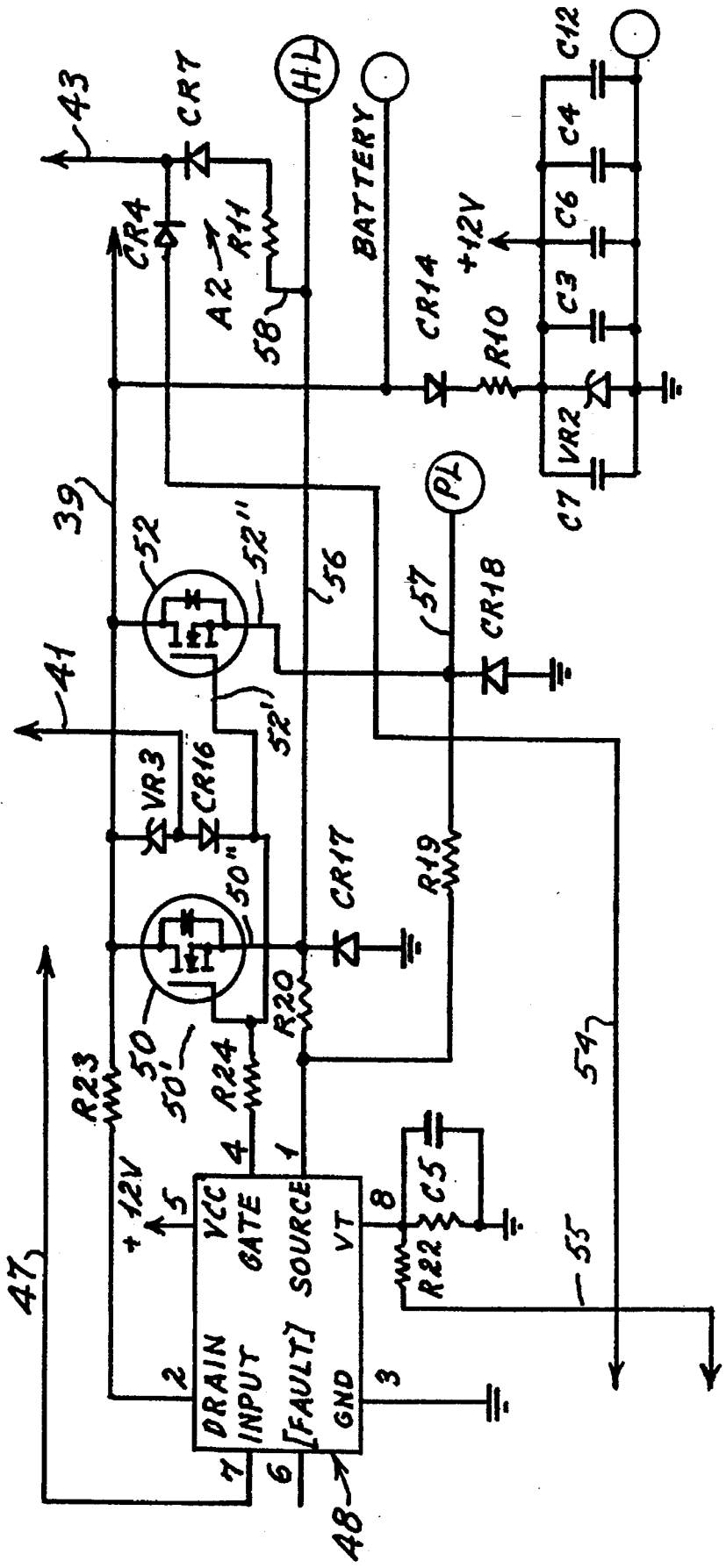
FIG. 5 is a circuit diagram of the navigational running light driver circuit of FIG. 1.

With particular reference to FIG. 5, the parking light and headlight driver circuit of the NL control circuit of the present invention is shown in greater detail. The navigational integrated FET driver 48 receives a control input at pin 7 from the output of AND gate A3.

In this embodiment, the integrated driver 46 is preferably a Motorola MC33091 integrated High Side driver which generates gate voltage for a pair of MOSFET switches 50 and 52. MOSFET switch 50 is connected at 56 to power the input terminal HL of the conventional headlight dimmer switch, that is, the power is applied downstream of the conventional headlight switch and thus is applied to its output, whereas MOSFET switch 52 is connected at 57 to control power to an output PL to the parking lights and ICC lights. The gate pin 4 of the integrated FET driver 48 is connected through a protective resistor R24 to the gates 50' and 52' of the MOSFETS 50 and 52. Further protective resistances are provided by resistors R20 and R19 located between source pin 1 of the integrated FET driver 48 and the source outputs 50" and 52" from the MOSFET switches 50 and 52, respectively. These resistances protect the integrated FET driver when transient currents occur on the external connections associated therewith.

The digital logic timer circuits of the integrated FET driver 48 are also connected to the regulated and filter power supply including C3, C4, C6, C7, C12 and VR2 which supplies voltage input at VCC or pin 5 of the FET driver. The drain pin 2 of FET driver is also connected through resistor R23 and line 39 with the drains of MOSFETS 50 and 52 to the positive side of the vehicle battery. Each MOSFET gate is further transient protected through resistance R24, coupling diode CR16 and clamping Zener diode VR3.

A further safety is incorporated in the NL control circuit to avoid MOSFET failure in the event of lost ground connection. The cathode of a diode CR17 is connected to the source output of MOSFET switch 50 whereas the annode of diode CR17 is connected to ground. In a like manner, the cathode of a diode CR18 is connected to the source output from the MOSFET switch 52 with its annode being connected to ground. These diodes provide electrical reference to ground in the event the system ground connection is lost and thereby prevents circuit failure. Without these diode component connections, a lost ground connection could ordinarily destroy the MOSFETS 50 and 52 because the integrated FET driver 48 would not be able to develop full voltage potential to properly power the input gates to the MOSFETS. Pin 8 of the FET driver 48 is also connected to an integration filter circuit R22 and C5 to ground.

From the foregoing, it is shown that a condition requiring navigation lighting will automatically cause the normal navigation lighting system to activate while simultaneously overriding the DRL control circuit and, upon removal of any need for navigation lighting, a DRL mode is again automatically reinstated. Further, the navigation lighting remains in effect for a timed period after removal of a demanding condition and various controlling and overriding inputs are available to modify each mode of operation.

Again referring to the block diagram of FIG. 1, it may be seen that a signal representing a low light condition at the Light Sensor input LS is conditioned to provide a digital signal, and further, it may be seen that a TRUE condition at either input of OR gate A5 will be passed along to the delay-Off timer 26 which is connected to the navigational Integrated FET Driver 48. Also, when the headlight and parking light MOSFETs 50 and 52 are switched ON by the Integrated FET driver 48, a TRUE signal is tapped from the headlight dimmer switch junction, HL, at 58 and is applied through OR gate A2 (R11, CR4, CR7) for the purpose of extinguishing the DRL FET driver 36 gate output voltage by applying a signal at pin 8 through connection 43.

If the Starter input 20 is activated after the circuit is enabled, as would be the case if restarting the engine, a Shut-OFF signal is applied to pin 8 of the Integrated FET Driver 48 through lines 54 and 55 to immediately extinguish all navigational lamps. This same signal is applied to pin 8 of the DRL FET driver 36 through line 54 and OR gate A2 to extinguish the DRL FET driver's gate output voltage. Also, it can be seen that a High signal applied to the Parking Brake indicator input 35 will disable FET Driver 48 through line 55 thereby disabling the navigational lighting function.

Further, upon removing any condition previously calling for navigation lighting, the input signal to the delay-Off timer 26 will become FALSE thereby disabling the FET Driver 48 and extinguishing the navigation lights. Under these conditions a FALSE signal is applied to the input 58 of OR gate A2 which is connected to the source output pin 1 of FET driver 48 thus permitting the DRL FET driver 36 to become active and power the MOSFET switch 37 to illuminate the High Beam filament HB.

As previously discussed, the navigational light control output 56 is connected to the headlight dimmer switch input HL. Therefore, the connection is intermediate to the vehicle manual light switch and the vehicle dimmer switch. In this manner, whenever the manual switch is activated, voltage from the battery is applied along line 56 to the input 58 of OR gate A2 which shuts-OFF the DRL FET Driver 36.

Figure 6:
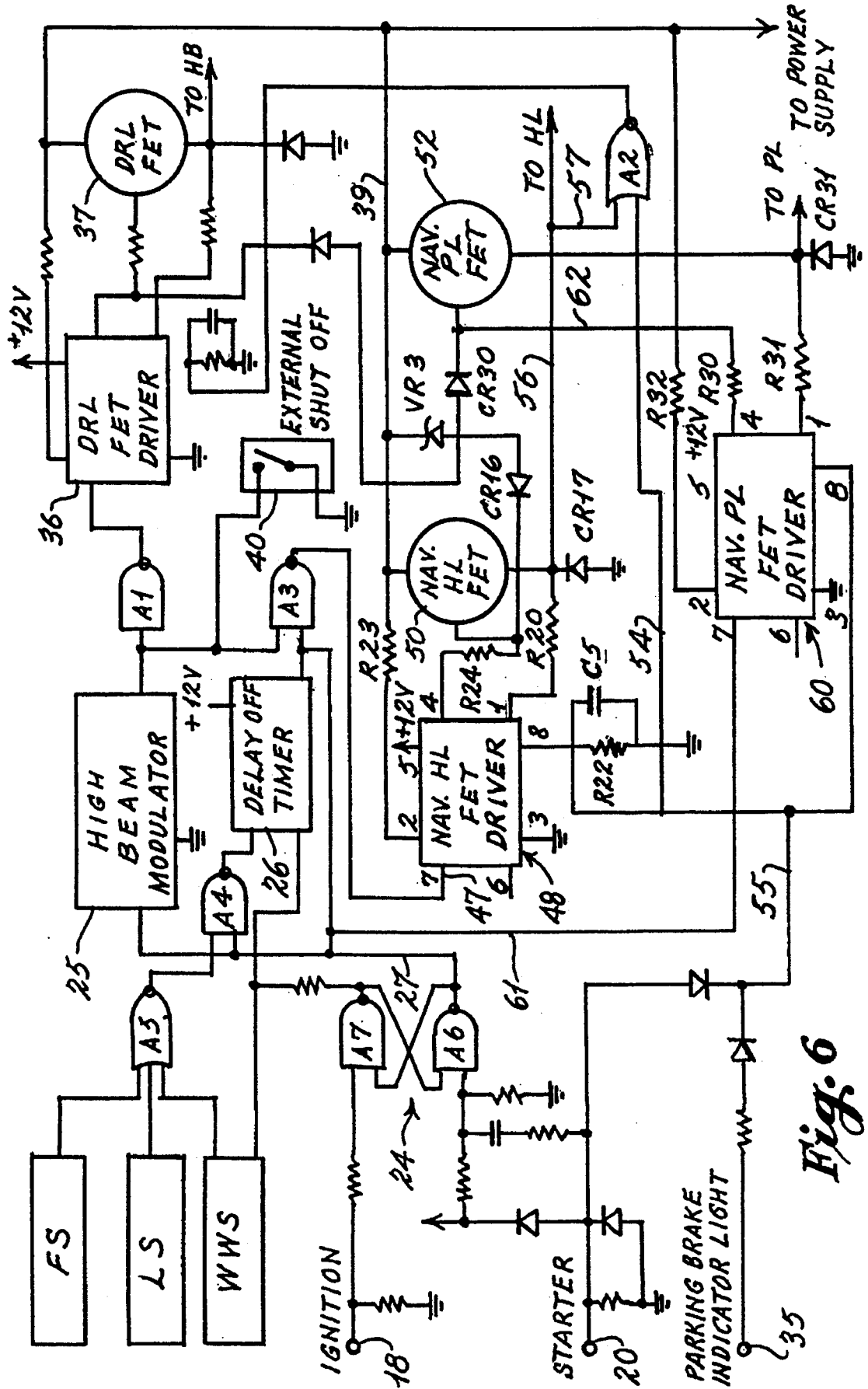
FIG. 6 is a diagram of an alternate embodiment of navigational running light driver circuit which may be used in which the vehicle taillights will be illuminated whenever the vehicle ignition switch is on and the starter motor is off.

With particular reference to FIG. 6 of the drawings, another embodiment of navigational running light driver circuit of the present invention is disclosed in greater detail. In this embodiment each of the navigational MOSFETS 50 and 52 are connected to receive their gate voltages from separate FET drivers 48 and 60. Thus, in this embodiment, the NL control system utilizes separate FET drivers for controlling power to the headlamps and to the parking lights and running lights.

The embodiment of invention shown in FIG. 6 also varies from the previous embodiment of FIG. 1 in that the parking lights are illuminated whenever the starter motor is OFF and the ignition is ON so that the vehicle taillights are illuminated at times the vehicle is operated with the exception of when the motor is being started. This provides an additional safety factor whenever the vehicle is operated. As shown in FIG. 6, the output from latching switch 24 from the ignition 18 is supplied through connection 27 and line 61 to the input 7 of FET driver 60 whenever the daytime running light control circuit is activated to illuminate the high beam filaments.

Both of the FET drivers 48 and 60 are controlled in the manner as previously discussed with respect to the embodiment incorporating a single FET driver for driving both MOSFETS 50 and 52. Therefore, whenever a condition is sensed which requires the activation of the NL control circuit, a TRUE signal will be applied to the delay-OFF timer 26 which will cause the output from AND gate A3 to be high thereby supplying input through connection 47 to the input pin 7 of the FET driver 48. In this embodiment, however, the output from the delay-OFF timer is applied directly through connection 61 to the input pin 7 of FET driver 60. In view of the foregoing, the external shut-off switch 40 is only connected to prevent activation of NL FET driver 48 by providing a ground connection to the input of AND gate A3. Thus, in this embodiment, closing the external shut-off switch 40 will extinguish power to both the DRL High Beam HB filaments and the NL navigational headlights at HL while the parking light PL remain operated. See Truth Table IV, below.

The gate pin 4 of FET driver 48 is connected through resistor R24 to the gate input of MOSFET 50. The drain pin 2 of FET driver 48 and the drain of MOSFET 50 are both connected through line 39 to the vehicle battery. The MOSFET gate is protected from transients through coupling diode CR16 and Zener diode VR3. Source pin 1 of FET driver 48 is connected through protective resistance R20 to the source output of the MOSFET 50 which output is connected through line 56 to power the input terminal HL of the conventional headlight dimmer switch in a manner as previously described with respect to the embodiment of FIG. 5. To avoid MOSFET switch failure in the event of a lost ground connection, the source output of MOSFET switch 50 is connected through diode CR17 to ground.

As with the previous embodiment, OR gate A2 receives an input signal responsive to MOSFET 50 being activated by way of connection 57 to connection 56 extending from MOSFET 50 to the input terminal HL of the headlight dimmer switch. In this manner, whenever the MOSFET 50 is activated to power the input terminal HL, OR gate A2 will supply a signal to pin 8 of the DRL FET driver 36 thereby extinguishing power from DRL FET 37 to the High Beam filaments HB.

In this embodiment, the FET driver 60 is connected to control the activation of MOSFET switch 52 which controls power to the parking and ICC running lights. Output gate pin 4 of FET driver 60 is connected through line 62 to the gate of the MOSFET 52. A protective resistance is provided by resistor R30. Both the FET driver and the MOSFET 50 are protected from transients by being connected at their gates through diode CR30 and Zener diode VR3 to line 39 extending to the battery and power supply. The source output pin 1 of FET driver 60 is connected through resistance R31 to the source output of MOSFET 52. The source output from MOSFET 52 is also connected to the parking light and ICC running light switches indicated at PL so that, when activated by the FET driver 60, power is supplied to the parking lights and ICC running lights. To avoid failure of MOSFET 52, the source output of the switch is connected through diode CR31 to ground.

The drain pins 2 of both FET drivers 48 and 60 are connected through resistances R23 and R32, respectively, to the drains of their respective MOSFETS 50 and 52 and to the positive side of the vehicle battery through line 39. The digital logic timer circuits of the integrated FET drivers 48 and 60 are powered from the same regulated and filtered power supply disclosed in FIG. 5 which supplies voltage input at pins 5 of each FET driver.

As with the previous embodiment, the NL control circuit of the present embodiment includes an input line 55 from the starter 18 and the parking brake indicator light 35. Whenever the starter is activated or the parking brake indicator light is ON or High, a signal is applied to pin 8 of each of the FET drivers 48 and 60 thereby extinguishing gate voltage to the MOSFETS 50 and 52. Pin 8 of each FET driver is also connected to a single integration filter circuit including resistor R22 and capacitor C5.

In view of the foregoing, in this embodiment, the control of the DRL circuit is substantially identical to that previously described with respect to the embodiments of FIGS. 1–5. In the present embodiment, however, the parking lights will be illuminated at all times the ignition switch is ON and the starter switch is OFF and a redundancy feature has been provided by incorporating separate FET drivers for activation of the vehicle headlights and for activation of the vehicle parking and ICC running lights so that the parking and ICC running lights may remain ON when the external shut-off switch is OFF.

The control of the High Beam filaments HB and the navigational running lights will be further understood with respect to the following Truth Tables.

A Truth Table, Table I, of the embodiment shown in FIG. 1 of the inputs (18, 20, LS, MS and WWS) and outputs (DRL HB, HL, PL) of the present invention when the parking brake indicator input is not in use is as follows:

TABLE I

| | 5 INPUTS | | | | | | | | | 3 OUTPUTS | | | | | |
|---|---|---|---|---|---|---|---|---|---|---|---|---|---|---|---|
| IGN(18) | 1 | 1 | 1 | 1 | 1 | 1 | 1 | 1 | 1 | 1 | 1 | 1 | 1 | 1 | 1 |
| ST (20) | 1 | 0 | 0 | 0 | 0 | 0 | 0 | 0 | 0 | 1 | 1 | 1 | 1 | 1 | 1 |
| LS | 0 | 0 | 1 | 1 | 1 | 1 | 0 | 0 | 0 | 1 | 1 | 1 | 1 | 0 | 0 |
| MS | 0 | 0 | 0 | 1 | 1 | 0 | 1 | 1 | 0 | 0 | 1 | 1 | 0 | 1 | 1 |
| WWS | 0 | 0 | 0 | 0 | 1 | 1 | 1 | 0 | 1 | 0 | 0 | 1 | 1 | 1 | 0 |
| DRL HB | 0 | 1 | 0 | 0 | 0 | 0 | 0 | 0 | 0 | 0 | 0 | 0 | 0 | 0 | 0 |
| HL | 0 | 0 | 1 | 1 | 1 | 1 | 1 | 1 | 1 | 0 | 0 | 0 | 0 | 0 | 0 |
| PL | 0 | 0 | 1 | 1 | 1 | 1 | 1 | 1 | 1 | 0 | 0 | 0 | 0 | 0 | 0 |

A Truth Table, Table II, of the embodiment shown in FIG. 6 of the inputs (18, 20, LS, MS and WWS) and outputs (DRL HB, HL, PL) of the present invention when the parking brake indicator input 35 is not in use is as follows:

TABLE II

| | 5 INPUTS | | | | | | | | | 3 OUTPUTS | | | | | |
|---|---|---|---|---|---|---|---|---|---|---|---|---|---|---|---|
| IGN(18) | 1 | 1 | 1 | 1 | 1 | 1 | 1 | 1 | 1 | 1 | 1 | 1 | 1 | 1 | 1 |
| ST (20) | 1 | 0 | 0 | 0 | 0 | 0 | 0 | 0 | 0 | 1 | 1 | 1 | 1 | 1 | 1 |
| LS | 0 | 0 | 1 | 1 | 1 | 1 | 0 | 0 | 0 | 1 | 1 | 1 | 1 | 0 | 0 |
| MS | 0 | 0 | 0 | 1 | 1 | 0 | 1 | 1 | 0 | 0 | 1 | 1 | 0 | 1 | 1 |
| WWS | 0 | 0 | 0 | 0 | 1 | 1 | 1 | 0 | 1 | 0 | 0 | 1 | 1 | 1 | 0 |
| DRL HB | 0 | 1 | 0 | 0 | 0 | 0 | 0 | 0 | 0 | 0 | 0 | 0 | 0 | 0 | 0 |
| HL | 0 | 0 | 1 | 1 | 1 | 1 | 1 | 1 | 1 | 0 | 0 | 0 | 0 | 0 | 0 |
| PL | 0 | 1 | 1 | 1 | 1 | 1 | 1 | 1 | 1 | 0 | 0 | 0 | 0 | 0 | 0 |

A Truth Table, Table III of both of the embodiments of the invention shown in FIGS. 1 and 6 of the inputs (18, 20, 35, LS, MS, WWS) and outputs (DRL HB, HL, PL) when the-parking brake indicator input is in use is as follows:

TABLE III

| | 6 INPUTS | | | | | | 3 OUTPUTS |
|---|---|---|---|---|---|---|---|
| IGN (18) | 1 | 1 | 1 | 1 | 1 | 1 | 1 |
| ST (20) | 0 | 0 | 0 | 0 | 0 | 0 | 0 |
| LS | 1 | 1 | 1 | 1 | 0 | 0 | 0 |
| MS | 0 | 1 | 1 | 0 | 1 | 1 | 0 |

TABLE III-continued

| | 6 INPUTS | | | | | | 3 OUTPUTS |
|---|---|---|---|---|---|---|---|
| WWS | 0 | 0 | 1 | 1 | 1 | 0 | 1 |
| DRL HB | 0 | 0 | 0 | 0 | 0 | 0 | 0 |
| HL | 0 | 0 | 0 | 0 | 0 | 0 | 0 |
| PL | 0 | 0 | 0 | 0 | 0 | 0 | 0 |
| PB | 1 | 1 | 1 | 1 | 1 | 1 | 1 |

It should be noted in the embodiment of FIGS. 1–5 that when the parking brake indicator input is in use but the emergency brake is not engaged, the Truth Table would be exactly as shown in Truth Table II with PB being "0" in each column.

A Truth Table, Table IV, of the embodiment of FIG. 6 of the inputs (18, 20, LS, MS and WWS) and outputs (DRL HB, HL, PL) of the present invention when the parking brake indicator input 35 is not in use and with the external shut-off (SO) closed to control the input to AND gate A3 to ground is as follows:

TABLE IV

| | 5 INPUTS | | | | | | | | | 3 OUTPUTS | | | | | | |
|---|---|---|---|---|---|---|---|---|---|---|---|---|---|---|---|---|
| IGN(18) | 1 | 1 | 1 | 1 | 1 | 1 | 1 | 1 | 1 | 1 | 1 | 1 | 1 | 1 | 1 | 1 |
| ST (20) | 1 | 0 | 0 | 0 | 0 | 0 | 0 | 0 | 0 | 1 | 1 | 1 | 1 | 1 | 1 | 1 |
| LS | 0 | 0 | 1 | 1 | 1 | 1 | 0 | 0 | 0 | 1 | 1 | 1 | 1 | 0 | 0 | 0 |
| MS | 0 | 0 | 0 | 1 | 1 | 0 | 1 | 1 | 0 | 0 | 1 | 1 | 0 | 1 | 1 | 0 |
| WWS | 0 | 0 | 0 | 0 | 1 | 1 | 1 | 0 | 1 | 0 | 0 | 1 | 1 | 1 | 0 | 1 |
| DRL HB | 0 | 0 | 0 | 0 | 0 | 0 | 0 | 0 | 0 | 0 | 0 | 0 | 0 | 0 | 0 | 0 |
| HL | 0 | 0 | 0 | 0 | 0 | 0 | 0 | 0 | 0 | 0 | 0 | 0 | 0 | 0 | 0 | 0 |
| PL | 0 | 1 | 1 | 1 | 1 | 1 | 1 | 1 | 1 | 0 | 0 | 0 | 0 | 0 | 0 | 0 |

From the foregoing, the Automatic Light System of the present invention functions to provide low energy operation of the DRL high beam filament and normal operation of the parking lights during daylight hours when no adverse ambient conditions are sensed. However, when adverse ambient conditions are sensed, the system automatically shuts-off the DRL operation and supplies power to the downstream side of the vehicle headlight switch and upstream of the vehicle dimmer switch. Therefore, if the conventional headlight switch is engaged, it will function to override and turn OFF the DRL circuit.

We claim:

1. An automatic ambient condition controlled daytime running light system for transport vehicles having an emergency brake, navigation lights including headlights with high and low beam filaments and parking lights, a power supply, a headlight switch for turning ON and OFF the headlights and a parking light switch for turning ON and OFF the parking lights, an ignition switch and a starter motor switch, the system comprising, a DRL control circuit having a first input from the ignition and an output to a first switching means connected to the high beam filaments for supplying power thereto, means for connecting said first switching means to the source of power, an NL control circuit, a plurality of ambient condition senors, a second input for connecting the ignition switch and outputs from said ambient condition sensors to said NL control circuit, said NL control circuit having an output connected to a second switch means for supplying power to the navigational lights, and output means from said NL control circuit connected to said DRL control circuit for extinguishing power to said first switch means when said NL control circuit is activated by signals received from said second input.

2. The light system of claim 1 including a first connector means for connecting said starter motor switch to said DRL control circuit and second connector means for connecting said starter motor switch to said NL control circuit whereby when said starter motor switch is in an ON condition, said outputs from said DRL control circuit and said NL control circuit will be FALSE whereby said first and second switches are deactivated.

3. The light system of claim 2 in which said output means from said NL control circuit connected to said DRL control circuit and said first connector means for connecting said starter motor switch to said DRL control circuit provide inputs to an OR gate having an output which is connected to said DRL control circuit.

4. The light system of claim 2 in which said DRL control circuit includes a power modulator means, said first switching means includes a MOSFET switch having a source connection to the high beam filaments and an input gate connection to an output gate of a first FET driver, said first FET driver having an input for receiving signals from said power modulator means whereby said first FET driver provides gate voltage at a periodic rate to said first MOSFET to thereby power the high beam filaments at a reduced voltage.

5. The light system of claim 4 including an external shut-off switch connected to said DRL control circuit whereby signals to said input to the first FET driver may be selectively terminated.

6. The light system of claim 4 in which said second switching means includes a second MOSFET switch having a source terminal connected to the output of the headlight switch and an input gate connected to the output gate of a second FET driver, said second switching means further including a third MOSFET switch having a source terminal connected to the output of the parking light switch and a gate terminal connected to the output gate of said second FET driver and said second FET driver having an input for receiving signals from said second input.

7. The light system of claim 6 in which each of said first and second FET drivers and said first, second and third MOSFET switches have drain connections and said drain connections being connected to the source of power.

8. The light system of claim 6 including a delay-OFF timer means connected between said input of said second FET driver and said second input whereby signals to said second FET driver may be controlled by said delay-OFF timer.

9. The light system of claim 8 including an external shut-off switch connected to said DRL control circuit and said NL control circuit whereby signals to said inputs of said first and second FET drivers may be selectively terminated.

10. The light system of claim 9 in which said external shut-off switch is connected between said power modulator means and said input of said first FET driver and between said delay-OFF timer and said input of said second FET driver.

11. The light system of claim 9 including a parking brake input means, said parking brake input means being activated when the transport vehicle emergency brakes are engaged, and means for connecting said parking brake input means to each of said first and second FET drivers whereby when said parking brake input means is in an ON condition, gate signals from said first and second FET drivers will be extinguished.

12. The light system of claim 4 in which said second switching means of said NL control circuit includes second and third MOSFET switches, said second MOSFET switch having a source terminal connected to the output of the headlight switch and a source terminal connected to the output of the parking light switch, said NL control circuit further including a second FET driver having an output gate connected to an input gate of said second MOSFET switch and having an input connected to said second input for connecting the ignition switch and the output from said ambient condition sensors, and a third FET driver having an output gate connected to an input gate of said third MOSFET switch and having an input connected to said second input for connecting the ignition switch and outputs from said ambient condition sensors to said NL control circuit.

13. The light system of claim 12 including connector means for connecting said input of said third FET driver to said first input.

14. The light system of claim 12 including a delay-OFF timer means mounted between said second input and each of said second and third FET driver inputs, said delay-OFF timer having an output, and means for connecting said output of said delay-OFF timer to said inputs of said second and third FET drivers.

15. The light system of claim 14 in which said means for connecting said output of said delay-OFF timer means includes a connector extending from said output to said input of said third FET driver, an AND gate means having an input for receiving said output from said delay-OFF timer means and a second input connected to an external shut-off switch, and said AND gate having an output connected to said input of said second FET driver, whereby when said external shut-off switch is in an OPEN position, signals to said input terminal of said second FET driver are terminated.

16. The light system of claim 15 in which each of said first and second and third FET drivers and said first, second and third MOSFET switches have drain connections, said drain connections being connected to the source of power.

17. The light system of claim 12 including an external shut-off switch connected to said DRL control circuit and said NL control circuit whereby signals to said inputs of said first, second and third FET drivers may be selectively terminated.

18. The light system of claim 12 including a parking brake input means, said parking brake input means being activated when the transport vehicle emergency brakes are engaged, and means for connecting said parking brake input means to each of said first, second and third FET drivers whereby when said parking brake indicator means is in an ON condition, gate signals from said first, second and third FET drivers will be extinguished.

19. The light system of claim 1 including a parking brake input means, said parking brake input means being activated when the transport vehicle emergency brakes are engaged, and means for connecting said parking brake input means to each of said DRL control circuit and said NL control circuit whereby when said parking brake input means is in an ON condition, said first and second switch means will be extinguished to thereby extinguish power to said high beam filament and said navigational lights.

20. The light system of claim 2 in which the high beam filaments, headlights and parking lights are activated in accordance with Truth Table, Table I.

21. The light system of claim 11 wherein the navigational lights including the high beam filaments, headlights and parking lights are activated in accordance with a Truth Table, Table III.

22. The light system of claim 13 in which the navigational lights including the high beam filaments, headlights and parking lights are activated in accordance with a Truth Table, Table II.

23. The light system of claim 13 in which the navigational lights including the high beam filaments, headlights and parking lights are activated in accordance with a Truth Table, Table IV.

24. A method for automatically controlling the lighting system for a transport vehicle depending upon time of day and ambient conditions wherein the transport vehicle has navigational lights including headlights with high and low beam filaments and parking lights, a power supply, a headlight switch for turning ON and OFF the headlights and a parking light switch for turning ON and OFF the parking lights, an ignition switch and a starter motor switch and a plurality of sensors for sensing various ambient conditions, and each of the sensors having an electrical output which is activated in response to an ambient condition being sensed, comprising the steps of:

a) during daylight hours powering the high beam filaments of the vehicle headlights at reduced power when the ignition switch is ON, the starter motor OFF, and the plurality of sensors outputs is in an ambient FALSE state;

b) automatically terminating power to the high beam filaments whenever one of the plurality of sensors senses a condition placing the output therefrom in a TRUE state with the ignition in an ON condition and the starter motor switch in an OFF condition and simultaneously supplying power to operate the navigational lights at a normal power level; and c) automatically re-energizing the high beam filament at a reduced power level and extinguishing the navigational lights when all the sensors outputs are in a FALSE state and the ignition switch is in an ON condition, the starter motor switch is in an OFF condition and the headlight switch is in an OFF condition.

25. The method of claim 24 in which the navigational lights including the high beam filaments, headlights and parking lights are activated in accordance with Truth Table, Table I.

26. The method of claim 24 in which during daylight hours powering the parking lights when the ignition switch is ON and the starter motor is OFF.

27. The method of claim 26 in which the navigational lights including the high beam filaments, headlights and parking lights are activated in accordance with a Truth Table, Table II.

28. A method for automatically controlling the lighting system for a transport vehicle depending upon time of day and ambient conditions wherein the transport vehicle has navigational lights including headlights with high and low beam filaments and parking lights, a power supply, a headlight switch for turning ON and OFF the headlights and a parking light switch for turning ON and OFF the parking lights, an ignition switch and a starter motor switch, a parking brake indicator electrical output, and a plurality of sensors for sensing various ambient conditions, and each of the sensors having an electrical output which is activated in response to an ambient condition being sensed comprising the steps of:

a) during daylight hours powering the high beam filaments of the vehicle headlights at reduced power when the ignition switch is ON, the starter motor OFF, the parking brake indicator output in a FALSE state, and the plurality of sensors outputs in a FALSE state;

b) automatically terminating power to the high beam filaments whenever one of the plurality of sensors senses a condition placing the output therefrom in a TRUE state with the ignition in an ON condition and the starter motor switch in an OFF condition, the parking brake indicator output in a FALSE state, and simultaneously supplying power to operate the navigational lights at a normal power level; and c) automatically re-energizing the high beam filament at a reduced power level and extinguishing the navigational lights when all the sensors outputs are in a FALSE state and the ignition switch is in an ON condition, the starter motor switch is in an OFF condition the parking brake indicator output in a false state, and the headlight switch is in an OFF condition.

29. The method of claim 28 in which the navigational lights including the high beam filaments, headlights and parking lights are activated in accordance with Truth Table, Table III.

30. An automatic ambient condition controlled daytime running light system for transport vehicles having an emergency brake, navigation lights including headlights with high and low beam filaments and parking lights, a power supply, a headlight switch for turning ON and OFF the headlights and a parking light switch for turning ON and OFF the parking lights, an ignition switch and a starter motor switch, the system comprising, a DRL control circuit having a first input from the ignition and an output to a first switching means connected to the high beam filaments for supplying power thereto, means for connecting said first switching means to the source of power, an NL control circuit, a plurality of ambient condition senors, a second input for connecting the ignition switch and outputs from at least one of said ambient condition sensors to said NL control circuit, said NL control circuit having an output connected to a second switch means for supplying power to the navigational lights, and output means from said NL control circuit connected to said DRL control circuit for extinguishing power to said first switch means when said NL control circuit is activated by signals received from said second input.

31. The light system of claim 30 including a parking brake input means, said parking brake input means being activated when the transport vehicle parking brake is engaged, and means for connecting said parking brake input means to each of said DRL control circuit and said NL control circuit whereby when said parking brake input means is in an ON condition, said first and second switch means will be extinguished to thereby extinguish power to said high beam filament and said navigational lights.

32. The light system of claim 30 including a first connector means for connecting said starter motor switch to said DRL control circuit and second connector means for connecting said starter motor switch to said NL control circuit whereby when said starter motor is in an ON condition, said outputs from said DRL control circuit and said NL control circuit will be FALSE whereby said first and second switches are deactivated.

33. An automatic ambient condition controlled daytime running light system for a transport vehicle having an emergency brake, navigation lights including headlights and parking lights, a power supply, a headlight switch for turning ON and OFF the headlights and a parking light switch for turning ON and OFF the parking lights, an ignition switch and a starter motor switch, the system comprising, a DRL control circuit having a first input from the ignition and an output to a first switching means connected to the headlights for supplying power thereto, means for connecting said first switching means to the source of power so as to supply power at a reduced level to said first switch means and thus to the headlights, an NL control circuit, at least one ambient condition sensor, a second input for connecting the ignition switch and outputs from said at least one ambient condition sensor to said NL control circuit, said NL control circuit having an output connected to a second switch means for supplying power to the navigational lights, and output means from said NL control circuit connected to said DRL control circuit for extinguishing power to said first switch means when said NL control circuit is activated by signals received from said second input.

34. The light system of claim 33 including a parking brake input means, said parking brake input means being activated when the transport vehicle parking brake is engaged, and means for connecting said parking brake input means to each of said DRL control circuit and said NL control circuit whereby when said parking brake input means is in an ON condition, said first and second switch means will be extinguished to thereby extinguish power to said DRL and NL control circuits.

35. The light system of claim 34 including a first connector means for connecting said starter motor switch to said DRL control circuit and second connector means for connecting said starter motor switch to said NL control circuit whereby when said starter motor is in an ON condition, said outputs from said DRL control circuit and said NL control circuit will be FALSE whereby said first and second switches are deactivated.

36. The light system of claim 33 including a first connector means for connecting said starter motor switch to said DRL control circuit and second connector means for connecting said starter motor switch to said NL control circuit whereby when said starter motor is in an ON condition, said outputs from said DRL control circuit and said NL control circuit will be FALSE whereby said first and second switches are deactivated.

37. A method for automatically controlling the lighting system for a transport vehicle depending upon time of day and ambient conditions wherein the transport vehicle has navigational lights including headlights and parking lights, a power supply, a parking brake, a headlight switch for turning ON and OFF the headlights and a parking light switch for turning ON and OFF the parking lights, an ignition switch, a starter motor switch and at least one sensor for sensing an ambient condition, and the at least one sensor having an electrical output which is activated in response to the ambient condition being sensed, comprising the steps of:

a) during daylight hours powering the vehicle headlights at reduced power when the ignition switch is ON, the starter motor OFF, and the at least one sensor output is in a FALSE state;

b) automatically terminating power at a reduced level to headlights whenever the at least one sensor senses the ambient condition placing the output therefrom in a TRUE state with the ignition in an ON condition and simultaneously supplying power to operate the navigational lights at a normal power level; and c) automatically re-energizing the headlights at a reduced power level and extinguishing the navigational lights when said at least one sensor output is in a FALSE state and the ignition switch is in an ON condition, and the headlight switch is in an OFF condition.

38. The method of claim 37 including the additional step of automatically terminating power to the vehicle navigational lights when the parking brake is engaged.

* * * * *